United States Patent [19]

Tamborrino

[11] 4,138,967
[45] Feb. 13, 1979

[54] WATER SUPPLY AND CONTROL DEVICE

[76] Inventor: Richard Tamborrino, 8127 W. 83rd St., Justice, Ill. 60458

[21] Appl. No.: 776,291

[22] Filed: Mar. 10, 1977

[51] Int. Cl.² .............................................. A01K 7/02
[52] U.S. Cl. ...................................... 119/78; 119/80
[58] Field of Search ............................. 119/78, 79, 80;
137/423, 417

[56] References Cited

U.S. PATENT DOCUMENTS

| 1,803,423 | 5/1931 | Brown | 137/417 |
|---|---|---|---|
| 3,823,692 | 7/1974 | Bowser | 119/78 |

Primary Examiner—Hugh R. Chamblee
Attorney, Agent, or Firm—Knechtel, Valentino, Demeur & Dallas

[57] ABSTRACT

A water supply and control device for animals in which a predetermined amount of water in a water reservoir must be removed before the reservoir is refilled.

The device consists of a water reservoir having a water supply pipe extending into the reservoir with a valve positioned within the pipe and controlling the flow of water through the supply pipe. An upper float assembly has a movable float within the reservoir and is mechanically linked to the valve to open and close it. A lower float assembly has a lower float connected to an arm which is pivotally connected to a fixed location in the reservoir. There is a brace member having one end connected to the arm and the opposite end engaging in restraining relationship the upper float assembly. The brace remains in the restraining relationship with the upper float assembly until the water within the reservoir falls to a predetermined level, with the lower float following the lowering water level until the predetermined level is reached. The brace is then released from the upper float assembly allowing the upper float to drop, opening the valve and allowing a fresh supply of water to enter the reservoir until the upper float assembly shuts off the valve and the brace of the lower float assembly again engages the upper float assembly.

8 Claims, 5 Drawing Figures

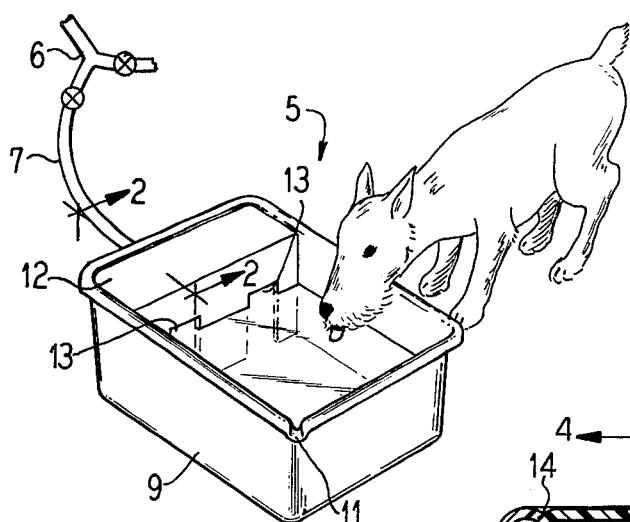
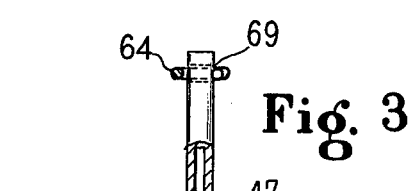
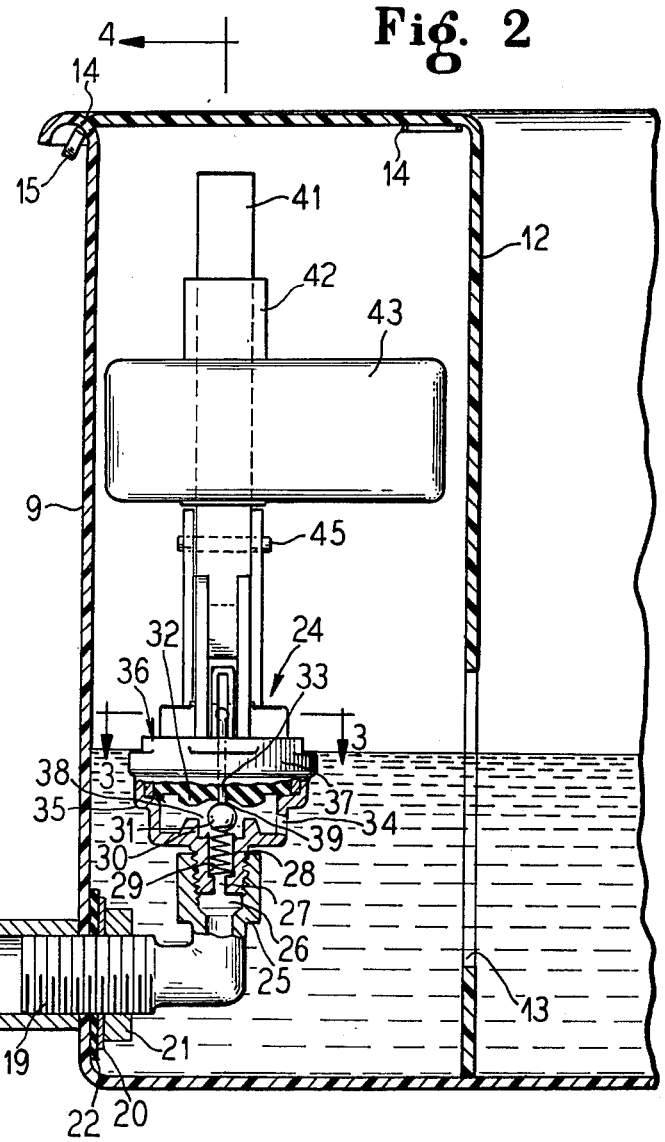

WATER SUPPLY AND CONTROL DEVICE

BACKGROUND OF THE INVENTION

This invention relates generally to watering devices for animals and more particularly concerns an automatic watering device which replenishes the water reservoir only after the reservoir is substantially emptied. The prior art has dealt with various types of watering devices for domestic house animals such as illustrated in U.S. Pat. No. 2,678,630 to R. O. Frederiksen. However, such patents have normally been of a demand type feeder wherein the animal must activate a ball or lever arm in order to release the water. Similarly, other watering tanks have been used for livestock. Examples are U.S. Pat. No. 2,570,694 to A. E. Langenbahm and U.S. Pat. No. 3,371,652 to R. A. Louks et al. Normally these devices have released a large quantity of water all at once into a watering trough, or a small amount of water is continually fed into the trough. At times, whenever a small amount of water has been drunk by the animal, the reservoir is immediately refilled.

OBJECTS AND ADVANTAGES OF THE INVENTION

It is an object of the present invention to devise a new animal water supply and control device which can be used for both domestic and farm animals. In particular, it is an object of this invention to provide an automatic system whereby the water is replenished for consumption by an animal after the water reservoir is emptied.

Another object of the invention is to provide a water supply and control device for animals wherein the replenishment of water to the water reservoir does not occur until the reservoir is substantially empty, thereby not allowing the water in the reservoir to become stagnant and allowing bacteria to develop and grow.

Yet another object of the invention is to provide a water reservoir wherein the water inlet valve directs a stream of water towards the bottom of the water reservoir in a turbulent fashion so that sediment is now allowed to collect on the bottom of the water reservoir.

Yet another object of the invention is to provide a water supply and control device for animals which is relatively simple and inexpensive to manufacture and easily installed by the user.

SUMMARY OF THE INVENTION

There is now provided a simply manufactured and easily installed water supply and control device for animals which includes a water reservoir of a size adapted to the type of animal which will use the invention. A water supply pipe extends into the reservoir and is normally fed from a spigot which has a constant supply of water available. Normally this can be achieved by adapting the normal household spigot with a Y-shaped connection, each branch of the Y having its own individual on-off valve arrangement whereby the water supply and control device can be fed with the valve in the continuous "on" position. The second valve can be selectively operated in the conventional manner, i.e., washing a car, watering the grass, etc. A valve is mounted within the water reservoir towards the end of the water supply pipe to control the flow of water into the reservoir. This valve is controlled by an upper float which shuts the flow of water off when the water reservoir is filled to a predetermined level. A lower float is connected to a brace, the lower float being raised as the water level in the reservoir is raised. The brace latches the upper the upper float in a raised position until a substantial predetermined amount of water is removed from the reservoir. At this point, the lower float drops, releasing the brace from the upper float, which opens the valve within the reservoir and allows the water reservoir to be refilled. The brace arrangement is designed in such a manner that the lower float is mounted to an arm on which the brace is also connected. Thus, water pressure supporting the lower float will also support the brace maintaining the upper float in the raised position even after the water supporting the upper float has been removed to a position below the upper float. Not until the water drops below the lower float is the upper float, controlling the water inlet valve, allowed to be released.

The floats and mechanical linkage are enclosed by a cover within the water reservoir so that the animal drinking from the reservoir cannot interfere with the control device.

The water inlet valve is directed to allow the water to flow into the reservoir in a high pressure stream directed to the bottom of the reservoir causing any sediment to be stirred into the water. In this manner, the reservoir is kept substantially free of sedimentation collecting on the bottom.

DESCRIPTION OF THE VIEWS OF THE DRAWINGS

The following detailed disclosure of the invention will be better understood by reference to the drawings which are identified as follows:

FIG. 1 is a perspective view of the water supply and control device connected to a water supply source;

FIG. 2 is an elevational view taken along line 2—2 of FIG. 1 with portions removed and on an enlarged scale;

FIG. 3 is a plan view in section taken along line 3—3 of FIG. 2 with portions removed;

DETAILED DESCRIPTION OF THE INVENTION

Figure 4:
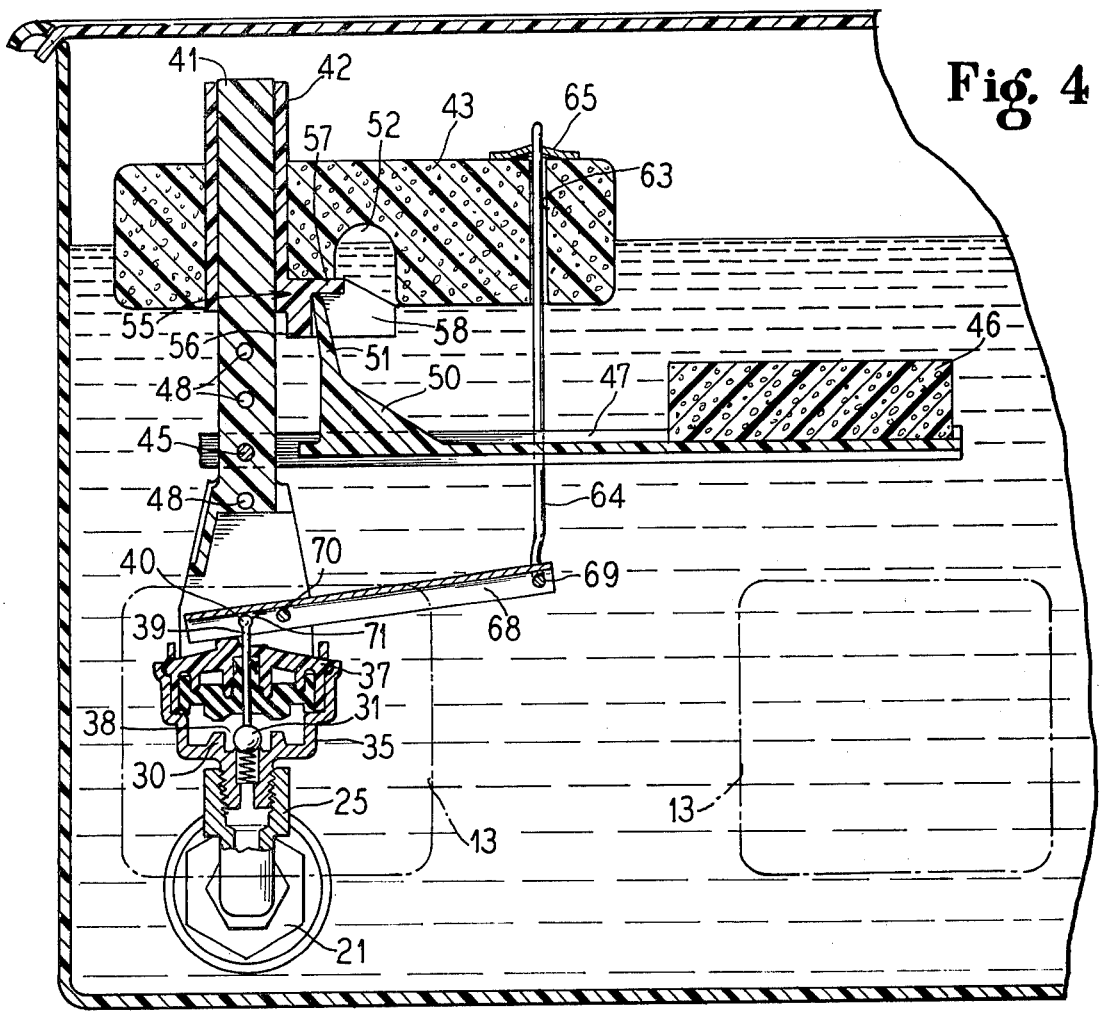
FIG. 4 is cross sectional view taken along line 4—4 of FIG. 2 with portions removed showing the mechanism with the reservoir full.

Turning first to FIG. 1, there is shown a water supply and control device 5 in a typical installation. Generally, the device will have a water supply fed from a household spigot through a Y fitting 6, each branch of the Y having an individual control valve. In this manner, one branch of the fitting can be used to supply the water supply and control device 5 and the other branch of the Y can be used for household purposes such as watering the grass, washing, etc. A supply hose 7 is connected to one branch of the Y fitting. The other end of the supply hose fits over an inlet pipe 8 as a sleeve type connection. This is more clearly illustrated in FIG. 2. The portion of the inlet pipe 8 which receives the supply hose has retaining notches 10 which act to engage the supply hose in a retaining frictional relationship so that the supply hose cannot easily be pulled away from the inlet pipe.

In the preferred embodiment as illustrated in FIG. 1, a reservoir 9 is used to retain the water which the animal consumes. There is an overflow notch 11 which excess water can be poured off through. The mechanical portion of the invention is enclosed within the reservoir 9 by a mechanism cover 12 which has ports 13 to allow the water to flow between the water inlet section and the drinking portion of the reservoir 9. FIG. 2 illustrates the manner in which the mechanism cover 12 is releasably mounted to the reservoir walls. Mechanism mounting slots 14 are cut within the reservoir walls through which cover tabs 15, which are a part of the mechanism cover 12 are inserted through. The cover tabs 15 are slightly enlarged relative to the mounting slots 44 so that the cover tabs 15 snap into said slots 14. In this manner, the mechanism cover 12 is firmly and releasably held in place over the mechanism portion of the invention.

The inlet pipe 8 is firmly affixed to the water reservoir 9 by means of an outer lock nut 16 engaging an outer threaded portion 17 of the inlet pipe 8. A spacer 18 separates the outer lock nut 16 from the reservoir wall 9. An inner threaded portion 19 on the inlet pipe 8 extends into the water reservoir 9. Around this inner threaded portion 16 and inside the reservoir 9 there is first a rubber washer 22 in contact with the reservoir wall 9. A metal washer 20 is adjacent the rubber washer 19 and an inner lock nut 21 is tightly screwed against the metal washer resulting in a rigid water tight connection.

The inlet pipe has a 90° elbow which connects upwardly with a valve assembly illustrated as 24. A valve base 25 has a valve inlet 26 wherein the water from the inlet pipe 11 is received. The water then travels through an inlet passageway 27 through a spring chamber 29 which retains a spring 28. The water then flows through a ball chamber shown generally as 38 which consists of ball chamber walls 30, a ball stop 31 and a ball chamber roof 32. FIG. 2 shows the valve in the open position allowing water to flow through the spring chamber 29, through the ball chamber 38 and out into the reservoir tank 9 through a valve outlet 34.

The valve assembly 24 is further comprised of a plunger assembly 36 consisting of a plunger housing 37 which encloses the assembly. The plunger housing 37 is removably, yet firmly frictionally retained by a valve seat 35 upon which the plunger housing 37 rests.

Centrally located in the plunger housing 37 and continuing through the ball chamber roof 32 is a plunger passageway 33 which is cylindrical in configuration. A plunger 39 extends through the plunger passageway 33 from the ball stop 31 up through the plunger housing 37 and captively held within a socket 71 within a pivotal link 68. The plunger 39 has a ball shaped plunger head 40 which is retained in the socket 71. This can be more clearly seen in FIGS. 4 and 5.

Figure 5:
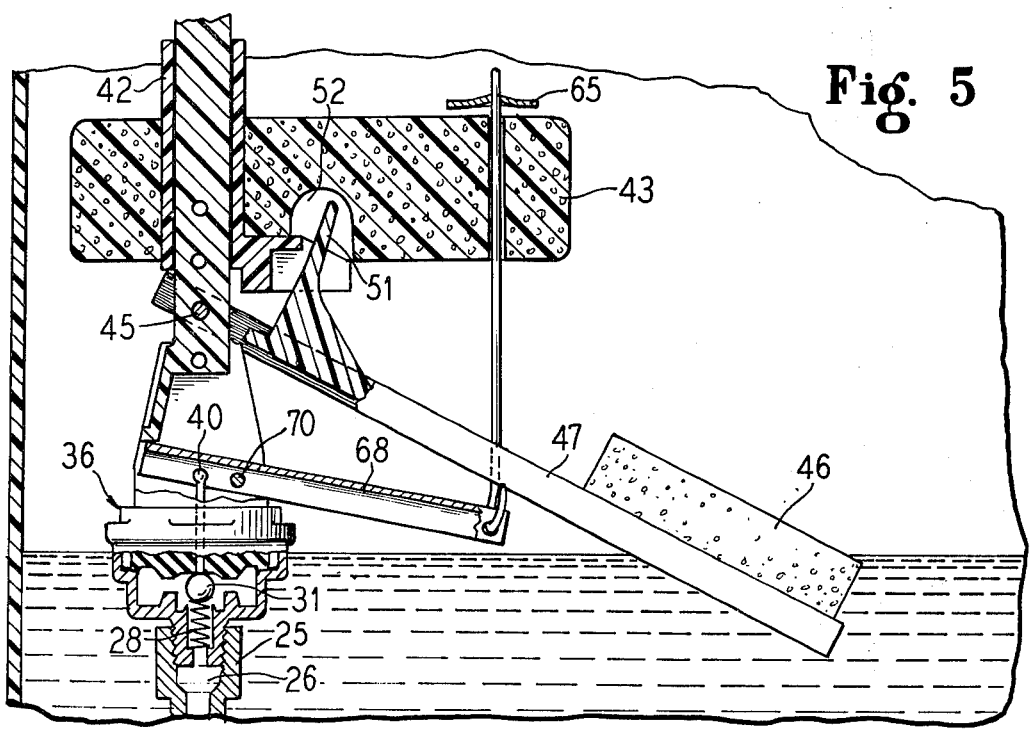
FIG. 5 is a view similar to FIG. 4 except showing the mechanism when the reservoir is in the low position.

FIGS. 4 and 5 also clearly indicate the operation of the water supply and control device 7.

Turning first to FIG. 5, the reservoir is shown with water in the lower or near empty condition. An upper float 43 is shown in its lowermost condition. It is restricted to vertical movement only along a vertical support 41 by means of a sliding member or tube 42 connected to the upper float 43. The sliding member 42 is dimensioned to closely receive the vertical support 41 but still not result in any binding of sliding member 42 along the vertical support 41. There is also an upper float passageway 63 through which a vertical link 64 passes. Above the upper float 43 and on the vertical link 64 an adjustable stop 65 is mounted. The bottom of the vertical link is hook shaped. The hook portion passing through a vertical pivot connection 69 located on the pivotal link 68. In FIG. 5, it can be seen that the ball stop 31 is in the raised position allowing water to enter through the spring chamber 29 into the ball chamber 38 and through the valve outlet 34. The water would then flow into the reservoir through the port 13.

As the water level is raised, a lower float 46 would begin to raise with the water level. The lower float 46 is connected to a lower arm 47 which pivots around a lower arm pivot 45, the pivot point being adjustable by means of removing a cotterpin passing through adjustment holes 48 and reinserting the lower arm 47 so that a different adjustment hole is used. The purpose of controlling the height of the lower arm 47 will be discussed later.

Also mounted on the lower arm 47 is a brace 50 having a finger 51. As the lower float is raised the tongue 50 will be rotated due to pivoting movement of the brace 50 until the finger 51 strikes the horizontal leg 57 of a latching member indicated generally as 55. The brace 50 being mounted on the lower arm will always move in a directly proportional pivotal relationship relative to the lower arm 47. There is a finger clearance gap 52 within the upper float 43 to allow the finger 51 non-binding movement relative to the upper float 43. Water continues filling the reservoir even with the lower arm 47 and lower float 46 submerged in water. A constant pressure would be applied by the finger 51 against the horizontal ledge 57 as long as the lower float 46 is submerged in water. As the water continues to fill the reservoir, the upper float 43 will begin to be raised by the water and continued movement urges the finger 51 to slip past the ledge 57. The top of the upper float 43 will first come into contact with the adjustable stop 65. As the upper float 43 continues to be raised, the vertical link 64 will also be drawn up with the upper float 43. The pivotal link 68 will pivot around a horizontal link pivot 70 which will begin to force the plunger head 40 in a downward motion.

FIG. 4 illustrates the water supply and control device in the filled position with the upper float 43 completely raised. In this position it can be seen that the plunger head 40 is forced downward by the pivoting of the horizontal link 68. Thus, the plunger 39 forces the ball stop 31 to compress the spring 28 and seals off the flow of water through the spring chamber 29 and into the ball chamber 38. The flow of water into the reservoir is thus stopped. The lower arm 47 is now in a substantially horizontal condition and the brace 50 has repositioned itself so that the finger 51 is resting against a backwall 56 of the latching member 55. The finger is retained within the latching member 55 not only because of the restraint of the backwall 56 but there are also sidewalls 58 prohibiting lateral movement.

As water is removed from the water reservoir 9, it can be seen that even after the water level has dropped below the bottom of the upper float 43, the upper float will not drop into a lower position because it is being supported by the finger 51. The finger remains in the position shown in FIG. 4 as long as the water level is high enough to maintain the lower float 46 in a substantially horizontal position. Thus, even though water is being removed from the reservoir, the valve assembly remains in the off position because the plunger 39 forces the ball stop 31 to remain seated over the spring chamber 29 stopping the flow of any water.

After a sufficient amount of water is removed from the water reservoir 9 to allow the lower float 46 to drop into the position shown in FIG. 5, the upper float 43 will also be allowed to drop into its lowered position causing the pivotal link 68 to pivot, raising the plunger 39. Thus, the ball stop 31 will be forced upward by the spring 28 once again allowing water to flow through the valve assembly 24 and into the reservoir 9.

Thus, a built-in delay is provided in the water supply and control device that is not dependent on time, but only dependent on the amount of water removed from the reservoir. As long as there is sufficient water in the reservoir to support the lower float 46 at a predetermined water level, the upper float will remain in its raised-valve off position.

It should also be noted that the valve outlet 34 has the flow of water directed directly through one of the ports 13 and further directed towards the bottom of the reservoir 9. Thus, when water flows through the valve outlet 34 it will cause any sediment resting at the bottom of the water reservoir 9 to be stirred in a turbulent manner into the water. Thus, the possibility of sediment collecting at the bottom of the reservoir is substantially reduced.

By making the length of the lower arm 47 longer or shorter, or by bending it downward or upward, it can be seen that the distance between the upper and lower floats, 43 and 46, can be varied. Thus, the amount of water removed from the reservoir before refilling is accomplished can be varied. Furthermore, the adjustable stop 65 and adjustment holes 48 can be used to vary the total height of the water in the reservoir by controlling the shut-off point of the valve.

Thus it is apparent that there has been provided, in accordance with the invention, a water supply and control device that fully satisfies the objects, aims and advantages set forth above. While the invention has been described in conjunction with specific embodiments thereof, it is evident that many alternatives, modifications, and variations will be apparent to those skilled in the art in the light of the foregoing description. Accordingly, it is intended to embrace all such alternatives, modifications and variations as fall within the spirit and broad scope of the appended claims.

What is claimed is:

1. A water supply and control device for animals which includes,
   a water reservoir,
   a water supply pipe extending into said water reservoir,
   a valve mounted on said supply pipe, said valve positioned within the water reservoir and controlling the flow of water through the water pipe,
   an upper float assembly having a movable float element within the water reservoir mechanically linked to open and close said valve,
   a lower float assembly having a float element connected to the end of an arm pivotally connected to a fixed location within said water reservoir,
   a brace member having one end connected to the top side of the arm of said lower float assembly, the opposite end of said brace member engaging restraining means in the upper float assembly, and
   means between the upper float assembly and the opposite end of the brace to allow said brace to remain in restraining engagement with the upper float assembly until the water within the reservoir falls to a predetermined level, said lower float assembly following the lowering of the water level until said predetermined level is attained whereby the brace is released from said upper float assembly allowing a fresh supply of water to enter the water reservoir until the upper float assembly shuts off the valve and the brace of the lower float assembly again engages the upper float assembly.

2. A water supply and control device for animals as in claim 1 wherein the movable float is slidingly mounted on a fixed vertical support to allow said movable float to move in only a vertical plane.

3. A water supply and control device for animals as in claim 1 above wherein the height of said upper float within said reservoir is adjustable thereby allowing the height of the water level to be varied before said valve is shut off.

4. A water supply and control device for animals as in claim 1 above wherein the height of said lower float assembly is adjustable thereby allowing the depth of the water level to be varied before said lower float assembly and brace is released from said upper float assembly turning said valve on.

5. A water supply and control device for animals as in claim 1 above and further including a removable cover within said reservoir to enclose said valve, upper float assembly, lower float assembly and brace.

6. A water supply and control device for animals as in claim 1 above wherein a single outlet from said valve causes the water to flow in a forceful stream against the bottom of said reservoir stirring any sediment up into the water, keeping the reservoir substantially sediment free.

7. A water supply and control device for animals as in claim 1 above wherein said brace moves in a directly proportional pivotal relationship relative to said arm of said lower float assembly.

8. A water supply and control device for animals as in claim 1 above wherein said restraining means in the upper float assembly is a latching member comprising a horizontal ledge and back wall.

* * * * *